(12) United States Patent
Hörger et al.

(10) Patent No.: US 8,933,378 B2
(45) Date of Patent: Jan. 13, 2015

(54) POWER SUPPLY SYSTEM FOR A POLYPHASE ARC FURNACE WITH AN INDIRECT CONVERTER BETWEEN A MAINS CONNECTION AND A FURNACE TRANSFORMER

(75) Inventors: Wolfgang Hörger, Hausen (DE); Wolfgang Meusel, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 927 days.

(21) Appl. No.: 13/121,736

(22) PCT Filed: Sep. 8, 2009

(86) PCT No.: PCT/EP2009/061605
§ 371 (c)(1),
(2), (4) Date: Mar. 30, 2011

(87) PCT Pub. No.: WO2010/037616
PCT Pub. Date: Apr. 8, 2010

(65) Prior Publication Data
US 2011/0176575 A1   Jul. 21, 2011

(30) Foreign Application Priority Data
Sep. 30, 2008   (DE) .......................... 10 2008 049 610

(51) Int. Cl.
*H05B 1/02*   (2006.01)
*H05B 7/00*   (2006.01)
(Continued)

(52) U.S. Cl.
CPC ................ *H05B 7/005* (2013.01); *H05B 7/144* (2013.01); *H02M 2007/4835* (2013.01)
USPC ........................................................ 219/497

(58) Field of Classification Search
CPC .......... H05B 7/00; H05B 7/144; H05B 7/018
USPC ............. 373/12, 47, 48, 90, 2, 104, 108, 147, 373/148, 150
See application file for complete search history.

(56) References Cited

U.S. PATENT DOCUMENTS

| 4,320,245 A | 3/1982 | Gaydon et al. .................... 13/12 |
| 4,698,581 A | 10/1987 | Shimamura et al. .......... 323/211 |

(Continued)

FOREIGN PATENT DOCUMENTS

| DE | 3025466 A1 | 2/1982 | ............. H05B 7/144 |
| DE | 3733077 A1 | 4/1989 | ............. H05B 7/144 |

(Continued)

OTHER PUBLICATIONS

Lesnicar, A. et al., "A New Modular Voltage Source Inverter Topology", Institute of Power Electronics and Control, 10 pages, 2003.

(Continued)

*Primary Examiner* — Dana Ross
*Assistant Examiner* — Joseph Iskra
(74) *Attorney, Agent, or Firm* — King & Spalding L.L.P.

(57) ABSTRACT

In a power supply system for a three-phase arc furnace (1), comprising at least one furnace transformer (4), the furnace transformer (4) is connected on the secondary side to the three-phase arc furnace (1). On the primary side, the furnace transformer (4) is connected to a three-phase supply mains (3) through an indirect converter (5). The indirect converter (5) comprises at least one rectifier (6) on the mains side, at least one inverter (7) on the transformer side, and an intermediate circuit (8) between the rectifier (6) and the inverter (7). Each phase of the three-phase supply mains (3) is connected to the intermediate circuit (8) through two converter elements (11) of the rectifier (6) in each case. Each primary-side phase of the furnace transformer (4) is connected to the intermediate circuit (8) through two converter elements (2) of the inverter (7) in each case.

20 Claims, 3 Drawing Sheets

(51) Int. Cl.
  *H05B 7/144* (2006.01)
  *H02M 7/483* (2007.01)

(56) References Cited

U.S. PATENT DOCUMENTS

| | | | | |
|---|---|---|---|---|
| 5,514,915 | A | * | 5/1996 | Kim et al. ............... 307/64 |
| 5,677,925 | A | * | 10/1997 | Du Parc et al. ............ 373/104 |
| 6,075,350 | A | | 6/2000 | Peng ..................... 323/207 |
| 6,274,851 | B1 | | 8/2001 | Mulcahy et al. ............ 219/501 |
| 6,421,366 | B1 | | 7/2002 | Breker et al. ............. 373/102 |
| 2002/0136260 | A1 | * | 9/2002 | Ma et al. ................. 373/104 |
| 2007/0247079 | A1 | * | 10/2007 | Sager et al. .............. 315/200 R |

FOREIGN PATENT DOCUMENTS

| | | | | |
|---|---|---|---|---|
| DE | 69022854 | T2 | 5/1996 | ............ H05B 7/144 |
| DE | 19920049 | A1 | 11/2000 | ............ H05B 7/144 |
| DE | 19920049 | C2 | 10/2001 | ............ F27B 3/08 |
| EP | 0023058 | A1 | 7/1980 | ............ H05B 7/00 |
| EP | 0214661 | A2 | 3/1987 | ............ H02J 3/18 |
| EP | 0214661 | B1 | 3/1992 | ............ H02J 3/18 |
| EP | 0483405 | A1 | 5/1992 | ............ H05B 7/144 |
| EP | 0647612 | B1 | 4/2001 | ............ H02J 3/18 |
| EP | 1848246 | A1 | 10/2007 | ............ H05B 7/00 |
| RU | 224193211 | C1 | 12/2004 | ............ F27D 11/08 |

OTHER PUBLICATIONS

Lesnicar, A. et al., "An Innovative Modular Multilevel Converter Topology Suitable for a Wide Power Range", IEEE Bologna Power Tech Conference, Bologna, Italy; 6 pages, Jun. 23, 2003.

Marquardt, R. et al., "Modulares Stromrichterkonzept für Netzkupplungsanwendung bei Hohen Spannungen", ETG Symposium, Bad Nauheim, 7 pages, 2002.

German Office Action, German patent application No. 10 2008 049 610.3-34, 4 pages, Jun. 11, 2009.

International Preliminary Report on Patentability, PCT/EP2009/061605, 13 pages, Dec. 27, 2010.

International PCT Search Report, PCT/EP2009/061605, 14 pages, Nov. 6, 2009.

* cited by examiner

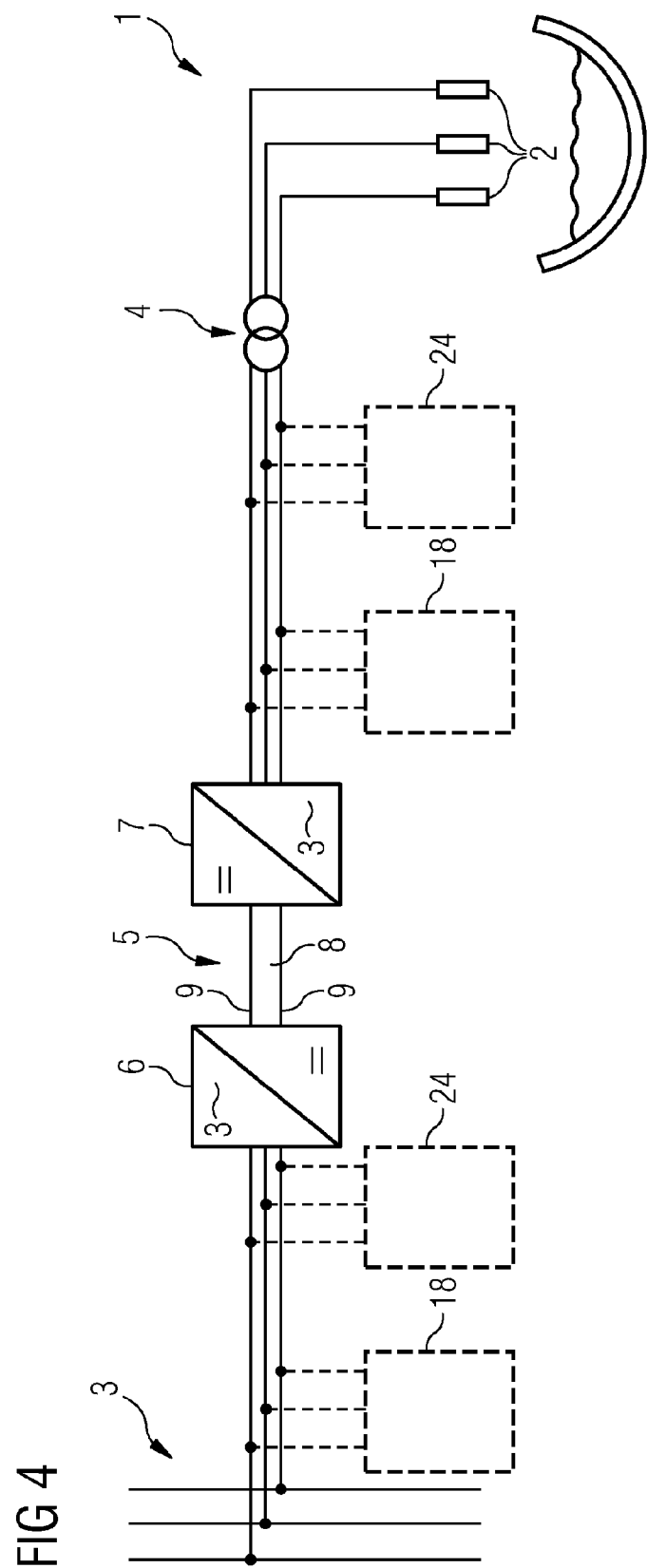

POWER SUPPLY SYSTEM FOR A POLYPHASE ARC FURNACE WITH AN INDIRECT CONVERTER BETWEEN A MAINS CONNECTION AND A FURNACE TRANSFORMER

CROSS-REFERENCE TO RELATED APPLICATIONS

This application is a U.S. National Stage Application of International Application No. PCT/EP2009/061605 filed Sep. 8, 2009, which designates the United States of America, and claims priority to DE Application No. 10 2008 049 610.3 filed Sep. 30, 2008.

TECHNICAL FIELD

The present invention relates to a power supply system for a polyphase arc furnace, wherein the power supply system has at least one furnace transformer whose primary is connected to a polyphase mains system and whose secondary is connected to the polyphase arc furnace.

BACKGROUND

Power supply systems such as these are generally known. Reference is made, purely by way of example, to EP 0 847 612 B1 and to EP 0 023 058 A1.

Polyphase arc furnaces represent a highly nonlinear load. The nonlinearities result in considerable reactions on the power supply system, in particular so-called flicker. For this reason, power supply systems for polyphase arc furnaces generally have a power factor corrector. The power factor corrector is connected in parallel with the furnace transformer. In the simplest case, the power factor corrector may be in the form, for example, of a so-called TCR (thyristor controlled reactor), see the cited EP 0 847 612 B1. It is likewise known for the power factor corrector to be in the form of a STATCOM (static compensator). In this context, reference is made, purely by way of example, to U.S. Pat. No. 6,075,350 A.

The current for operating a polyphase arc furnace is very high. For this reason, attempts are made to arrange the furnace transformer as close as possible to the polyphase arc furnace itself in order that the cable length from the furnace transformer to the polyphase arc furnace can be kept as short as possible. In general, the furnace transformer and the components arranged downstream from the furnace transformer are arranged in the furnace building. The space conditions in the furnace building are quite confined, for this reason. Furthermore, the number of phases and the operating frequency of the polyphase arc furnace in the prior art necessarily matches the number of phases and the operating frequency of the polyphase mains system.

DE 199 20 049 C2 discloses a power supply system for a polyphase arc furnace, in which an indirect converter is arranged immediately upstream of the polyphase arc furnace. The indirect converter has a rectifier on the input side, an inverter on the output side, and a link circuit between them. DE 199 20 049 C2 does not mention a furnace transformer. This may be a component of a polyphase source mentioned in DE 199 20 049 C2.

EP 0 023 058 A1 discloses a power supply system for a polyphase arc furnace, in which control means or converters with thyristors can be provided on the primary and secondary sides of a transformer. The control means and converters are in the form of current controllers, according to EP 0 023 058 A1.

DE 30 25 644 A1 discloses a power supply system for a polyphase arc furnace, in which the primary of a furnace transformer is connected directly to the polyphase mains system, and the secondary is connected directly to the polyphase arc furnace. The phases on the output side of the furnace transformer are connected to one another via bridge circuits, with the bridge circuits each consisting of a capacitor and a switch connected in series.

SUMMARY

According to various embodiments, a power supply system for a polyphase arc furnace can be provided, in which it is possible to decouple the number of phases and the operating frequency of the polyphase arc furnace from those of the polyphase mains system. A further aim is to make it possible to limit reactions on the power supply system to the balanced real power.

According to an embodiment, in a power supply system for a polyphase arc furnace, the power supply system has at least one furnace transformer whose primary is connected via an indirect converter to a polyphase mains system and whose secondary is connected to the polyphase arc furnace, the indirect converter has at least one rectifier on the mains side, at least one inverter on the transformer side, and a link circuit between the rectifier and the inverter, each phase of the polyphase mains system is connected to the link circuit via in each case two converter elements of the rectifier, and each primary phase of the furnace transformer is connected to the link circuit via in each case two converter elements of the inverter.

According to a further embodiment, each converter element may consist of a multistage series circuit of submodules,—each submodule may comprise an energy storage capacitor and self-commutated semiconductor switches, the semiconductor switches in each submodule can be switched independently of the semiconductor switches in the other submodules in the same converter element and in the other converter elements, such that the energy storage capacitor in the respective submodule is bridged or active by means of the semiconductor switches in the respective submodule, depending on their switching state, and the semiconductor switches in the converter elements can be operated such that reactions, which go beyond the balanced load on the phases of the polyphase mains system with real power, of the phases of the polyphase arc furnace on the polyphase mains system are minimized. According to a further embodiment, the number of semiconductor switches per submodule can be two. According to a further embodiment, the furnace transformer does not have a power factor corrector connected in parallel with it. According to a further embodiment, a power factor corrector can be connected in parallel with the furnace transformer. According to a further embodiment, the power factor corrector may have a number of further converter elements, each further converter element may consist of a multistage series circuit of further submodules, each of which comprises an energy storage capacitor and self-commutated semiconductor switches, the semiconductor switches in each further submodule can be switched independently of the semiconductor switches in the other further submodules in the same further converter element and in the other further converter elements, such that the energy storage capacitor in the respective further submodule is bridged or active by means of the semiconductor switches in the respective further submodule, depending on their switching state, and the semiconductor switches in the further submodules can be operated such that reactions, which go beyond the balanced load on the phases of the polyphase mains system with real power, of the phases of the polyphase arc furnace on the polyphase mains system are minimized. According to a further embodiment, the power factor corrector can be connected to the primary phases of the furnace transformer. According to a further embodiment, the power factor corrector can be connected to the phases of the polyphase mains system. According to a further embodiment, a capacitor circuit can be connected to the primary phases of the furnace transformer and/or to the phases of the polyphase mains system. According to a further embodiment, each inverter can be connected to a maximum of one furnace transformer.

BRIEF DESCRIPTION OF THE DRAWINGS

Further advantages and details will become evident from the following description of exemplary embodiments in conjunction with the drawings, in which, illustrated in outline form:

FIG. 4 shows an alternative embodiment of a power supply system, and

DETAILED DESCRIPTION

Figure 1:
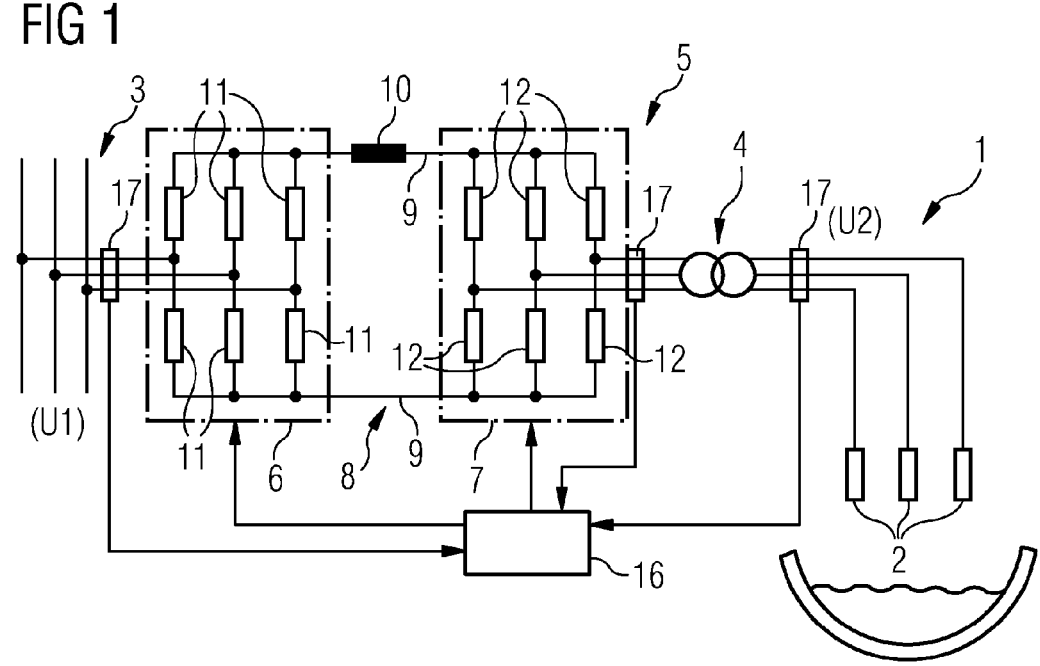
FIG. 1 shows a power supply system for a polyphase arc furnace.

According to various embodiments, the primary of the furnace transformer is connected via an indirect converter to the polyphase mains system. The indirect converter has at least one rectifier on the mains side, at least one inverter on the transformer side and a link circuit between the rectifier and the inverter. Each phase of the polyphase mains system is connected to the link circuit via in each case two converter elements of the rectifier. Each primary phase of the furnace transformer is connected to the link circuit via in each case two converter elements of the inverter.

In particular the embodiment makes it possible to avoid the indirect converter being connected to the secondary of the furnace transformer. The indirect converter can therefore be arranged outside the furnace building.

In one refinement of the power supply system, each converter element consists of a multistage series circuit of submodules. Each submodule comprises an energy storage capacitor and self-commutated semiconductor switches. The semiconductor switches in each submodule can be switched independently of the semiconductor switches in the other submodules in the same converter element and in the other converter elements, such that the energy storage capacitor in the respective submodule is bridged or active by means of the semiconductor switches in the respective submodule, depending on their switching state. The semiconductor switches in the converter elements are operated such that reactions, which go beyond the balanced load on the phases of the polyphase mains system with real power, of the phases of the polyphase arc furnace on the polyphase mains system are minimized. This embodiment makes it possible to compensate for undesirable power supply system reactions (in particular reactive-power components and unbalanced loads on the phases of the polyphase mains system) in a simple manner. Furthermore, this provides greater flexibility for the spatial arrangement of the individual components of the power supply system.

In a minimal configuration, the number of semiconductor switches per submodule is two. In this case, the submodule generally has a single energy storage capacitor.

In an embodiment of the power supply system, it is possible not to connect a power factor corrector in parallel with the furnace transformer. Alternatively, a power factor corrector or filter circuits can be connected in parallel with the furnace transformer.

If the power factor corrector is present, in one embodiment, it has a number of further converter elements. Each further converter element in this case consists of a multistage series circuit of further submodules, each of which comprises an energy storage capacitor and self-commutated semiconductor switches. The semiconductor switches in each further submodule can be switched independently of the semiconductor switches in the other further submodules in the same further converter element and in the other further converter elements, such that the energy storage capacitor in the respective further submodule is bridged or active by means of the semiconductor switches in the further submodule, depending on their switching state. The semiconductor switches in the further submodules are operated such that reactions, which go beyond the balanced load on the phases of the polyphase mains system with real power, of the phases of the polyphase arc furnace on the polyphase mains system are minimized. The power factor corrector can be connected to the primary phases of the furnace transformer and/or to the phases of the polyphase mains system.

Alternatively or in addition to the presence of the power factor corrector, it is possible, for example, to connect a capacitor circuit, for example a capacitor bank, to the primary phases of the furnace transformer and/or to the phases of the polyphase mains system.

In general, the power supply system according to various embodiments has a single furnace transformer, a single rectifier and a single inverter. However, there may be more than one of said components. For example, the power supply system may have a plurality of parallel-connected rectifiers. This allows a greater current to be fed into the link circuit. Alternatively or additionally, the power supply system may have a plurality of parallel-connected inverters. By way of example, this allows a furnace transformer to be supplied with a greater primary current, or a plurality of furnace transformers can be supplied with primary current, or else other components can be supplied with electrical power. Particularly when there are a plurality of furnace transformers, each inverter is, however, preferably connected to a maximum of one furnace transformer.

As shown in FIG. 1, a polyphase arc furnace 1 has a plurality of electrodes 2 which are fed from a polyphase mains system 3. As is generally normal practice, the polyphase arc furnace 1 is fed via a furnace transformer 4, which transforms a relatively high voltage U1 from the polyphase mains system 3 (for example 30 kV or 110 kV) down to a relatively low furnace voltage U2 (in general several hundred volts up to a maximum of 2 kV). The electrodes 2 are connected directly to the secondary of the furnace transformer 4. In consequence, the furnace transformer 4 is in the form of a polyphase transformer and has at least two, and in general three, phases.

The polyphase mains system 3 may be an external, larger mains system. Alternatively, it may be an internal mains system to the operator of the polyphase arc furnace 1. In the case of an internal mains system, it may alternatively be an autonomous mains system or a mains system which is connected to an external mains system via a step-down transformer.

In contrast to the prior art, the furnace transformer 4 is not connected directly to the polyphase mains system 3. According to various embodiments, an indirect converter 5 is arranged between the primary of the furnace transformer 4 and the polyphase mains system 3. The indirect converter 5 has a rectifier 6 on the mains side and an inverter 7 on the transformer side. A link circuit 8 is arranged between the rectifier 6 and the inverter 7. Each phase of the polyphase mains system 3 is connected to the link circuit 8 via in each case two converter elements 11 of the rectifier 6. Each primary phase of the furnace transformer 4 is likewise connected to the link circuit 8 via in each case two converter elements 12 of the inverter 7.

The link circuit 8 may alternatively be in the form of a current link circuit or a voltage link circuit. If the link circuit 8 is in the form of a current link circuit, an inductor 10 is arranged between the rectifier 6 and the inverter 7 in one of the connecting lines 9 of the link circuit 8. If the link circuit 8 is in the form of a voltage link circuit, the inductor 10 can be omitted. In this case, alternatively, a central backup storage capacitor can be arranged in the link circuit 8, or capacitors may be arranged in the converter elements 11, 12 of the rectifier 6 and/or of the inverter 7.

Figure 2:
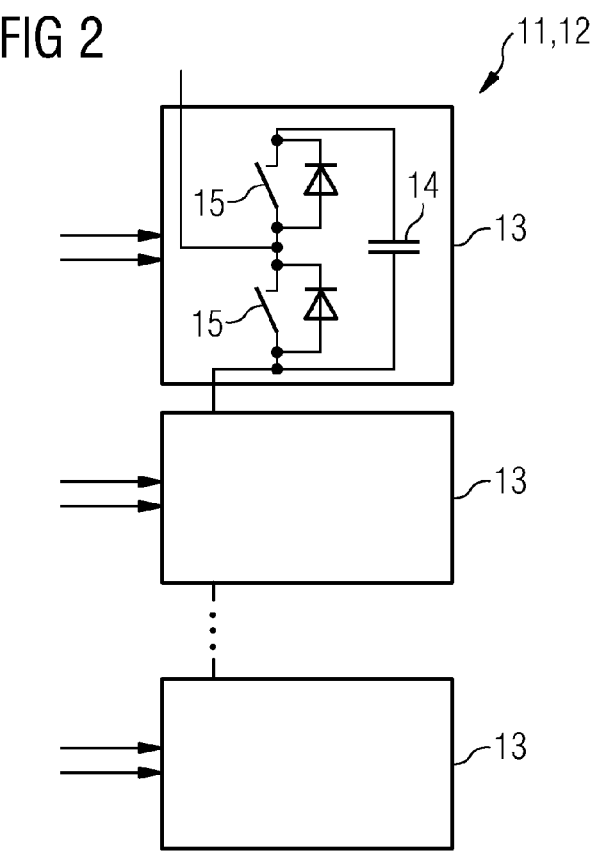
FIG. 2 shows a converter unit.

In general, the converter elements 11 of the rectifier 6 are physically the same as one another. In general, the converter elements 12 of the inverter 7 are likewise physically the same as one another. Furthermore, the converter elements 11 of the rectifier 6 and the converter elements 12 of the inverter 7 are in general physically the same. The converter elements 11, may be configured and operated as required. Each of the converter elements 11, 12 as shown in FIG. 2 preferably consists of a multistage series circuit of submodules 13. The number of submodules 13 is chosen as required. In general, there are ten or more such submodules 13 for each converter element 11, 12. The number of submodules 13 for each converter element 11, 12 is preferably 20 to 200. The number of submodules is preferably between 30 and 80. The submodules 13 are physically the same as one another. FIG. 2 illustrates one of the submodules 13 in detail. The following statements relate to this submodule 13.

As shown in FIG. 2, each submodule 13 comprises an energy storage capacitor 14 and self-commutated semiconductor switches 15. The term "self-commutated" means that the semiconductor switches 15 can be switched both on and off by externally supplied control signals, by means of the semiconductor switches 15. By way of example, the self-commutated semiconductor switches 15 may in the form of IGBTs or GTO thyristors. The term "self-commutated" is in contrast to the term "mains-commutated". This term means that, although the respective switching element can be switched on deliberately, it cannot, however, be switched off by an external control signal. One example of a mains-commutated semiconductor switching element is a "normal" thyristor. The energy storage capacitors 14 in the submodules 13 in their totality provide a backup capacitance. The indirect converter in this embodiment is therefore in the form of a voltage indirect converter.

Figure 3:
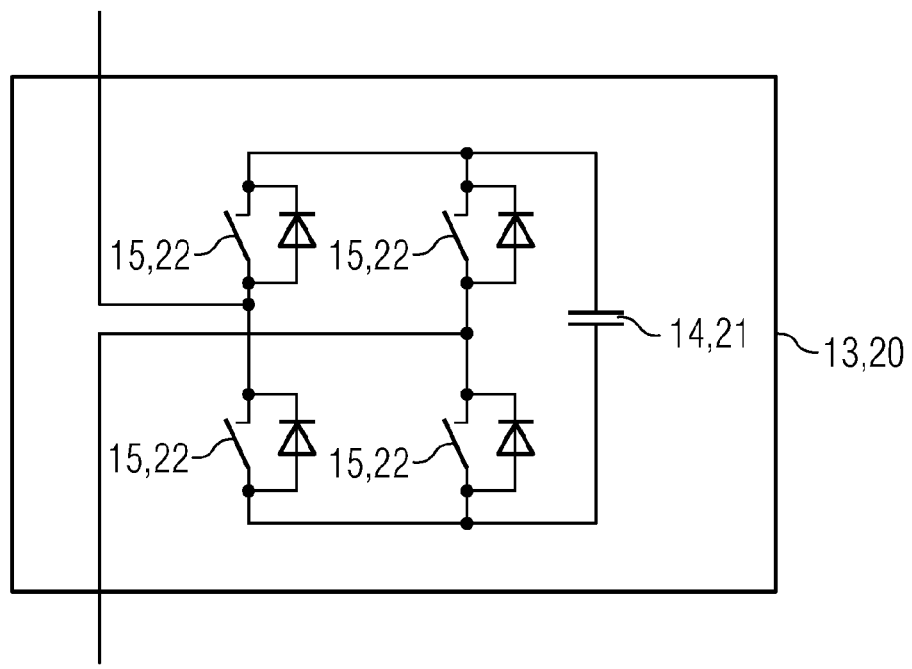
FIG. 3 shows a submodule.

As shown in FIG. 2, the submodules 13 each have a single energy storage capacitor 14 and two, and only two, semiconductor switches 15. This configuration is the minimal configuration of the submodules 13. Alternatively, as illustrated in FIG. 3 by way of example, the submodules 13 could have one energy storage capacitor 14 and four semiconductor switches 15 in a bridge circuit. In addition, the submodules 13 could have a plurality of energy storage capacitors 14. In this case, there would have to be at least two semiconductor switches 15 for each energy storage capacitor 14.

The semiconductor switches 15 in each submodule 13 can be switched independently of the semiconductor switches 15 in the other submodules 13. This is true irrespective of whether the other submodules 13 are arranged in the same or in one of the other converter elements 11, 12 as the relevant submodule 13. Depending on the switching state of the semiconductor switches 15 in the respective submodule 13, the energy storage capacitor 14 in the respective submodule 13 is alternatively bridged or active. When the upper semiconductor switch 15 in a submodule 13 as shown in FIG. 2 is closed and the other semiconductor switch 15 is open, the energy storage capacitor 14 in the respective submodule 13 is active. Conversely, when the upper semiconductor switch 15 in FIG. 2 is open and the lower semiconductor switch 15 is closed, the energy storage capacitor 14 in the respective submodule 13 is bridged.

The semiconductor switches 15 in the converter elements 11, 12 are operated—see FIG. 1 in addition—by a control device 16 such that reactions, which go beyond the balanced load on the phases of the polyphase mains system 3 with real power, of the phases of the polyphase arc furnace 1 on the polyphase mains system 3 are minimized. For this purpose, at least the primary and/or the secondary phase voltages of the furnace transformer 4 and/or the phase currents flowing in the respective phases of the furnace transformer 4 and/or the voltages across the energy storage capacitors 14 in the submodules 13 are supplied by means of suitable sensors 17, which are known by a person skilled in the art, to the control device 16. Furthermore, the phase voltages and/or the phase currents in the polyphase mains system 3 and/or the link-circuit voltage and/or the link-circuit current can be supplied to the control device 16.

The determination of the corresponding control signals for the semiconductor switches 15 is known per se. In particular, they are operated in the same manner as that known, by way of example, from one of the following specialist articles:

"A new modular voltage source inverter topology" by A. Lesnicar et al., European Power Electronics Conference, Toulouse 2003, "An Innovative Modular Multilevel Converter Topology Suitable for a Wide Power Range" by A. Lesnicar et al., IEEE-Powertech Conference, Bologna 2003, "Modulares Stromrichterkonzept für Netzkupplungsanwendung bei hohen Spannungen" by Rainer Marquardt et al., ETG Symposium 2002 in Bad Nauheim.

The reaction of the operation of the polyphase arc furnace 1 on the polyphase mains system 3 is considerably reduced even on the basis of appropriate operation of the semiconductor switches 15 in the converter elements 11, 12 in the rectifier 6 and the inverter 7. In many cases, it is therefore possible, as shown in the illustration in FIG. 1, not to connect a power factor corrector in parallel with the furnace transformer 4. However, in one alternative embodiment (see FIG. 4), it is possible to connect a power factor corrector 18 in parallel with the furnace transformer 4. The reactions on the polyphase mains system 3 can be (possibly even further) minimized by the (possibly additional) presence of the power factor corrector 18.

Figure 5:
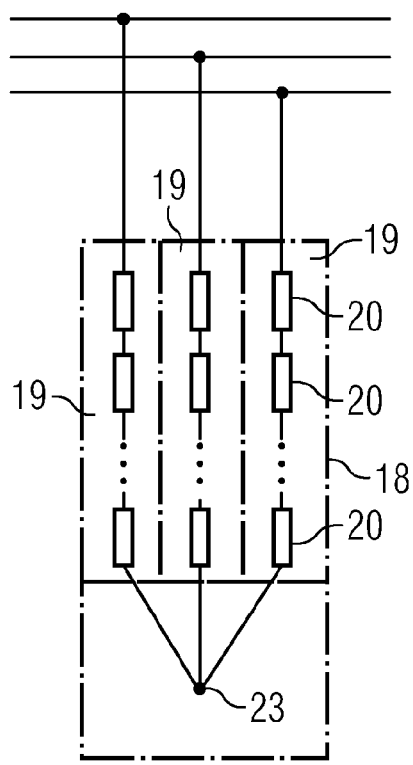
FIG. 5 shows a further converter element.

The power factor corrector 18 may be designed in a conventional form, for example as a conventional SVC or conventional TCR. Alternatively, it is possible for the power factor corrector 18—see FIG. 5—to have a number of further converter elements 19. As shown in FIG. 5, each further converter element 19 consists of a multistage series circuit of further submodules 20. Each further submodule 20 is designed at least to correspond to the configuration shown in FIG. 3. It comprises at least one energy storage capacitor and four self-commutated semiconductor switches 22, with the self-commutated semiconductor switches 22 being arranged in a full-bridge circuit, and with the energy storage capacitor 21 being arranged in the bridge arm of the full-bridge circuit.

Analogously to the converter elements 11, 12 in the rectifier 6 and in the inverter 7, the semiconductor switches 22 in each further submodule 20 in the further submodules 20 in the further converter elements 19 can also be switched independently of the semiconductor switches 22 in the other further submodules 20 in the same further converter element 19 and the other further converter elements 19. Depending on the switching state of the semiconductor switches 22 in the respective further submodule 20, the corresponding energy storage capacitor 21 is alternatively bridged or active. In the situation in which the respective energy storage capacitor 21 is active, the polarity can also be adjusted. The semiconductor switches 22 in the further submodules 20 are operated by the control device 16 such that reactions, which go beyond the balanced load on the phases of the polyphase mains system 3 with real power, on the phases of the polyphase arc furnace 1 on the polyphase mains system 3 are minimized. The determination of the appropriate operating signals for the semiconductor switches 22 is known, see, for example, the initially cited U.S. Pat. No. 6,075,350 A.

The further converter elements 19 in the power factor corrector 18 have a structure which corresponds to the configuration of the converter elements 11, 12 in the rectifier 6 and the inverter 7. The number of further submodules 20 for each further converter element 19 may be in the same order of magnitude as the number of submodules 13 for each converter element 11, 12. However, alternatively, the number may also have a different value.

As shown in the illustration in FIG. 5, the further converter elements 19 are on the one hand connected to in each case one of the primary phases of the furnace transformer 4, and on the other hand are connected to a common star point 23 of the primary phases of the furnace transformer 4. Alternatively, it would be possible to connect the further converter elements 19 to in each case two primary phases of the furnace transformer 4.

In the embodiment shown in FIG. 4, the power factor corrector 18 is, as already mentioned, connected to the primary phases of the furnace transformer 4. However, alternatively or additionally, it is possible, as indicated by dashed lines in FIG. 4, for the power factor corrector 18 or a further power factor corrector 18 to be connected to the phases of the polyphase mains system 3. In this situation as well, a star circuit as illustrated in FIG. 5 or a delta circuit is alternatively possible, between in each case two phases. Alternatively or in addition to the power factor corrector 18 (or the power factor correctors 18), capacitor circuits 24 may be provided, as shown in FIG. 4. If they are present, the capacitor circuits 24 are of a purely passive design. They consist at least of capacitive reactances. If required, they may additionally have inductive reactances, thus upgrading the capacitor circuits 24 to form filter circuits. The power supply system according to various embodiments has a large number of advantages. For example, the number of phases of the polyphase arc furnace 1 is independent of the number of phases of the polyphase mains system 3. For example, the polyphase mains system 3 could have three phases, with the polyphase arc furnace 1 having four or five phases. An opposite embodiment is also possible. The amplitude, waveform, level of balancing etc of the furnace current can be controlled and influenced. Furthermore, the operation of the polyphase arc furnace 1 can be decoupled from the frequency of the polyphase mains system 3. For example, as is generally normally the case, if the polyphase mains system 3 is at a mains frequency of 50 Hz or 60 Hz, then it is possible, for example, to operate the polyphase arc furnace 1 at a higher frequency of—purely by way of example—100 Hz or 150 Hz, or at a lower frequency of, for example, 30 Hz or 40 Hz. This makes it possible to influence the closed-loop control of the arc. Because the power factor corrector 18 may be omitted or may even be linked directly to the polyphase main system 3, optimized operation of the polyphase arc furnace 1 is also possible. The indirect converter 5 need not be arranged within the furnace building.

The above description is intended exclusively to be an explanation of the present invention. The scope of protection of the present invention is, in contrast, intended to be defined exclusively by the attached claims.

The invention claimed is:

1. A power supply system for a polyphase arc furnace, comprising:
    at least one furnace transformer whose primary is connected via an indirect converter to a polyphase mains system and whose secondary is connected to the polyphase arc furnace,
    wherein the indirect converter has at least one rectifier on the mains side, at least one inverter on the transformer side, and a link circuit between the rectifier and the inverter,
    wherein each phase of the polyphase mains system is connected to the link circuit via two converter elements of the rectifier, and
    wherein each primary phase of the furnace transformer is connected to the link circuit via two converter elements of the inverter,
    wherein each converter element of the two converter elements of the rectifier and the two converter elements of the inverter consists of a multistage series circuit of submodules,
    wherein each submodule of the submodules comprises an energy storage capacitor and self-commutated semiconductor switches, and
    wherein the self-commutated semiconductor switches in each submodule can be switched independently of the self-commutated semiconductor switches in other submodules in a same converter element and in other converter elements, such that the energy storage capacitor in a respective submodule is bridged or active by means of the self-commutated semiconductor switches in the respective submodule, depending on their switching state.

2. The power supply system according to claim 1, wherein the self-commutated semiconductor switches in the converter elements are operated such that reactions, which go beyond the balanced load on the phases of the polyphase power supply system with real power, of the phases of the polyphase arc furnace on the polyphase mains system are minimized.

3. The power supply system according to claim 2, wherein the number of self-commutated semiconductor switches per submodule is two.

4. The power supply system according to claim 2, wherein the furnace transformer does not have a power factor corrector connected in parallel with it.

5. The power supply system according to claim 1, wherein a power factor corrector is connected in parallel with the furnace transformer.

6. The power supply system according to claim 5, wherein the power factor corrector has a number of further converter elements,
each further converter element of the number of further converter elements consists of a multistage series circuit of further submodules, each further submodule of the further submodules of which comprises an energy storage capacitor and self-commutated semiconductor switches,
the self-commutated semiconductor switches in each further submodule can be switched independently of the self-commutated semiconductor switches in other further submodules in a same further converter element and in other converter elements, such that the energy storage capacitor in a respective further submodule is bridged or active by means of the self-commutated semiconductor switches in the respective further submodule, depending on their switching state, and
the self-commutated semiconductor switches in the further submodules are operated such that reactions, which go beyond the balanced load on the phases of the polyphase mains system with real power, of the phases of the polyphase arc furnace on the polyphase mains system are minimized.

7. The power supply system according to claim 5, wherein the power factor corrector is connected to the primary phases of the furnace transformer.

8. The power supply system according to claim 5, wherein the power factor corrector is connected to the phases of the polyphase mains system.

9. The power supply system according to claim 1, wherein a capacitor circuit is connected to at least one of the primary phases of the furnace transformer and to the phases of the polyphase mains system.

10. The power supply system according to claim 1, wherein each inverter is connected to a maximum of one furnace transformer.

11. A method for providing power to a polyphase arc furnace, comprising:
connecting a primary of at least one furnace transformer via an indirect converter to a polyphase mains system and connecting a secondary of the at least one furnace transformer to the polyphase arc furnace, wherein the indirect converter has at least one rectifier on the mains side, at least one inverter on the transformer side, and a link circuit between the rectifier and the inverter,
connecting each phase of the polyphase mains system to the link circuit via two converter elements of the rectifier, and
connecting each primary phase of the furnace transformer to the link circuit via two converter elements of the inverter, wherein each converter element of the two converter elements of the rectifier and the two converter elements of the inverter consists of a multistage series circuit of submodules,
providing for each submodule of the submodules an energy storage capacitor and self-commutated semiconductor switches, and
switching the self-commutated semiconductor switches in each submodule independently of the self-commutated semiconductor switches in other submodules in a same converter element and in other converter elements, such that the energy storage capacitor in a respective submodule is bridged or active by means of the self-commutated semiconductor switches in the respective submodule, depending on their switching state.

12. The method according to claim 11, further comprising operating the self-commutated semiconductor switches in the converter elements such that reactions, which go beyond the balanced load on the phases of the polyphase power supply system with real power, of the phases of the polyphase arc furnace on the polyphase mains system are minimized.

13. The method according to claim 12, wherein the number of self-commutated semiconductor switches per submodule is two.

14. The method according to claim 12, wherein the furnace transformer does not have a power factor corrector connected in parallel with it.

15. The method according to claim 11, wherein a power factor corrector is connected in parallel with the furnace transformer.

16. The method according to claim 15, wherein the power factor corrector has a number of further converter elements, each further converter element of the number of further converter elements consists of a multistage series circuit of further submodules, each further submodule of the further submodules of which comprises an energy storage capacitor and self-commutated semiconductor switches, and the method further comprises:
switching the self-commutated semiconductor switches in each further submodule independently of the self-commutated semiconductor switches in other further submodules in a same further converter element and in other converter elements, such that the energy storage capacitor in a respective further submodule is bridged or active by means of the self-commutated semiconductor switches in the respective further submodule, depending on their switching state, and
operating the self-commutated semiconductor switches in the further submodules such that reactions, which go beyond the balanced load on the phases of the polyphase mains system with real power, of the phases of the polyphase arc furnace on the polyphase mains system are minimized.

17. The method according to claim 15, further comprising connecting the power factor corrector to the primary phases of the furnace transformer.

18. The method according to claim 15, further comprising connecting the power factor corrector to the phases of the polyphase mains system.

19. The method according to claim 11, further comprising connecting a capacitor circuit to at least one of the primary phases of the furnace transformer and to the phases of the polyphase mains system.

20. The method according to claim 11, further comprising connecting each inverter to a maximum of one furnace transformer.

* * * * *